(12) United States Patent
Hiller

(10) Patent No.: US 10,742,329 B2
(45) Date of Patent: Aug. 11, 2020

(54) DRONE ENABLED GLOBAL COMMUNICATIONS SYSTEM FOR UNDERWATER PLATFORMS

(71) Applicant: The Boeing Company, Chicago, IL (US)

(72) Inventor: Nathan D. Hiller, Irvine, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/108,542

(22) Filed: Aug. 22, 2018

(65) Prior Publication Data
US 2020/0067604 A1 Feb. 27, 2020

(51) Int. Cl.
*H04B 10/80* (2013.01)
*H04B 10/50* (2013.01)
*B64C 39/02* (2006.01)

(52) U.S. Cl.
CPC .......... *H04B 10/80* (2013.01); *B64C 39/024* (2013.01); *H04B 10/503* (2013.01); *B64C 2201/122* (2013.01)

(58) Field of Classification Search
CPC .... H04B 10/80; H04B 10/503; B64C 39/024; B64C 2201/122
See application file for complete search history.

(56) References Cited

U.S. PATENT DOCUMENTS

| 8,203,495 | B2 | 6/2012 | Tonn | |
|---|---|---|---|---|
| 2007/0183783 | A1* | 8/2007 | Lam | F41H 13/005 398/123 |
| 2016/0127042 | A1* | 5/2016 | Farr | H04B 11/00 398/104 |
| 2019/0146501 | A1* | 5/2019 | Schick | G05D 1/0094 701/3 |

* cited by examiner

*Primary Examiner* — Ted M Wang
(74) *Attorney, Agent, or Firm* — Yee & Associates, P.C.

(57) ABSTRACT

A method, apparatus, and system for facilitating communications with an underwater platform. A radio frequency signal is received at an antenna system connected to an unmanned aerial vehicle. Information is encoded in the radio frequency signal. The information in the radio frequency signal is placed into a laser beam. The transmitting the laser beam from the unmanned aerial vehicle to an underwater platform submerged in a body of water.

18 Claims, 8 Drawing Sheets

DRONE ENABLED GLOBAL COMMUNICATIONS SYSTEM FOR UNDERWATER PLATFORMS

BACKGROUND INFORMATION

1. Field

The present disclosure relates generally to a communications system and, in particular, to a method, apparatus, and system for communicating with an underwater platform.

2. Background

Communications on a global level between vehicles, round stations, and other platforms occur using high frequency (HF) radio frequency signals. These signals have frequencies from about 3 megahertz to 30 megahertz. These frequencies are useful for long range communications because radio frequency signals within a range can be reflected back to Earth by the ionosphere layer in the atmosphere. This type of transmission is also called skip propagation or skyway propagation, and can be used to communicate across intercontinental distances. The radio frequency signals are directed at an angle into the sky such that the radio frequency signals are reflected back towards the Earth. The Earth can reflect these signals back up to the ionosphere. In this manner, the high frequency radio waves can travel beyond the horizon and around the curve of the Earth.

Antennas that are commonly used for transmitting high frequency radio frequency signals are wire antennas. These wire antennas include wire dipoles, rhombic antennas, and other suitable types of antennas. Antennas for receiving high frequency radio frequency signals are typically random wire antennas.

This type of communication, however, is unavailable to submerged underwater vehicles. Water blocks the high frequency radio frequency signals. Currently, existing systems involve having underwater vehicle rise to the surface and raise an antenna or deploy a floating wire antenna. Having the underwater vehicle surface reduces efficiency in the speed of travel and increases the vulnerability of the underwater vehicle. A floating wire antenna is bulky and inefficient.

Therefore, it would be desirable to have a method and apparatus that take into account at least some of the issues discussed above, as well as other possible issues. For example, it would be desirable to have a method and apparatus that overcome a technical problem with communicating with a submerged underwater vehicle.

SUMMARY

In an embodiment of the present disclosure, a communications system for an underwater platform comprises an unmanned aerial vehicle; a radio frequency communications system connected to the unmanned aerial vehicle; a laser communications system connected to the unmanned aerial vehicle; and a controller. The controller controls the laser communications system to place information in a received radio frequency signal received by the radio frequency communications system into a laser beam and control the laser communications system to transmit the laser beam that contains the information into a body of water.

In another embodiment of the present disclosure, a communications system for an underwater platform comprises an unmanned aerial vehicle; a wire connected to unmanned aerial vehicle; a receiver connected to the unmanned aerial vehicle; a laser communications system connected to the unmanned aerial vehicle; and a controller. The wire has a length selected to send and receive high frequency radio frequency signals. The receiver receives the high frequency radio frequency signals received by the wire. The controller controls the laser communications system to transmit information in a received high frequency radio frequency signal received by the receiver in a laser beam at an underwater platform submerged in a body of water.

In still another illustrative embodiment of the present disclosure, a communications system comprises an unmanned aerial vehicle; a wire; a high frequency radio communications system connected to the unmanned aerial vehicle; and a controller. The wire has a fixed end connected to the unmanned aerial vehicle, a free end, and a length sufficient to transmit and receive high frequency radio frequency signals. The high frequency radio communications system transmits and receives the high frequency radio frequency signals using the wire. The controller controls the high frequency radio communications system to transmit and receive the high frequency radio frequency signals using the wire.

In yet another illustrative embodiment of the present disclosure, a method facilitates communications with an underwater platform. A radio frequency signal is received at an antenna system connected to an unmanned aerial vehicle. Information is encoded in the radio frequency signal. The information in the radio frequency signal is placed into a laser beam. The laser beam is transmitted from the unmanned aerial vehicle to an underwater platform submerged in a body of water.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
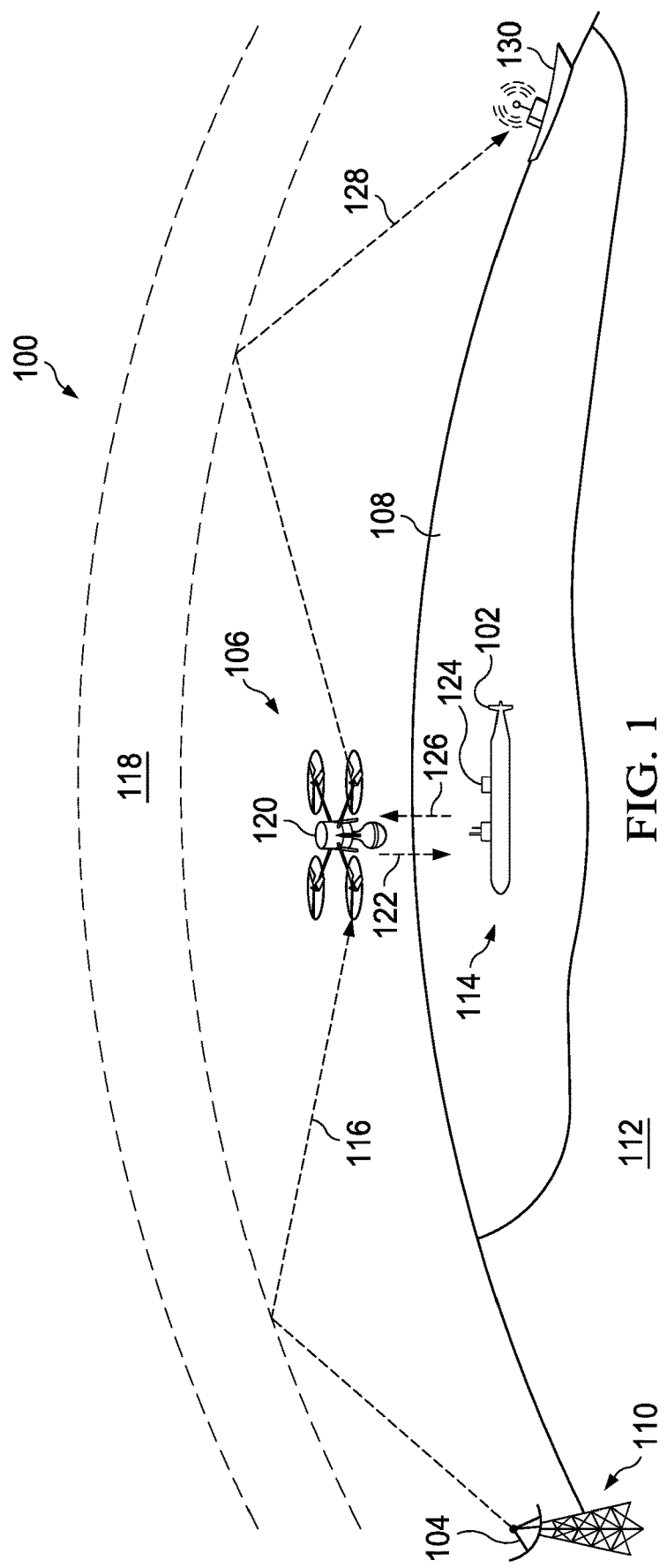
FIG. 1 is a pictorial illustration of a communications environment in accordance with an illustrative embodiment.

With reference now to the figures and, in particular, with reference to FIG. 1, a pictorial illustration of a communications environment is depicted in accordance with an illustrative embodiment. Communication environment 100 is an environment in which submerged submersible platforms, such as submarine 102, can communicate using high frequency radio frequency signals.

For example, submarine 102 can communicate with high frequency transmitter 104 in high frequency global communications system 106 while submarine 102 is submerged in ocean 108. As depicted, high frequency transmitter 104 is on ground location 110 located over the horizon of Earth 112 from submerged location 114 of submarine 102.

As depicted, high frequency transmitter 104 transmits information encoded in high frequency radio frequency signal 116 to submarine 102. In this illustrative example, high frequency radio frequency signal 116 bounces off of ionosphere 118 and is received by unmanned aerial vehicle 120.

In turn, unmanned aerial vehicle 120 takes the information in high frequency radio frequency signal 116 and places the information into an optical signal that is transmitted as laser beam 122. In other words, the information encoded in high frequency radio frequency signal 116 can be extracted by decoding high frequency radio frequency signal 116 and then the information is encoded in laser beam 122. This encoding of the information in laser beam 122 can be performed by modulating laser beam 122. As depicted, laser beam 122 is directed at submarine 102, which has laser communications system 124 that receives laser beam 122 to receive the information transmitted by high frequency transmitter 104. The encoding can be digital or analog in these depicted examples.

Submarine 102 can transmit information in laser beam 128 which is directed at unmanned aerial vehicle 120. In response to receiving laser beam 126, unmanned aerial vehicle 120 places the information received in laser beam 126 in high frequency radio frequency signal 128 and transmits high frequency radio frequency signal 128 with the information to surface ship 130.

Thus, unmanned aerial vehicle 120 enables submarine 102 to receive information transmitted in high frequency radio frequency signals while submarine 102 is submerged under ocean 108. Thus, submarine 102 can receive data contained in the optical signal transmitted as laser beam 122 from unmanned aerial vehicle 122 without surfacing. Further, submarine 102 can transmit its own data to unmanned aerial vehicle 120 in laser beam 126 with that data being converted into one or more high frequency radio frequency signals for transmission to a target such as high frequency transmitter 104 or surface ship 130 in this example.

The use of unmanned aerial vehicle 120 eliminates the need for floating wire antennas that are bulky and inefficient. In the illustrative examples, unmanned aerial vehicle 120 can be deployed by submarine 102, a surface ship, an aircraft, or from some other source. Unmanned aerial vehicle 120 can be retrieved for recharging or can be abandoned, self-destructed, or destroyed when no longer needed.

The illustration of communications environment 100 is meant as an example of one implementation in an illustrative example. This illustration is not intended to limit the manner in which other illustrative examples can be. For example, the illustrative examples include other high frequency transmitters in addition to transmitter 104 in different locations. Further, other underwater platforms can be present in addition to or in place of submarine 102. For example, a submersible, an underwater habitat, or other submersible platform can be used in addition to or in place of submarine 102. Other platforms in addition to or in place of surface ship communicate using high frequency radio frequency signals. For example, at least one of an aircraft, a ground vehicle, a train, an office complex, or some other mobile or stationary platforms that employ high frequency radio frequency signals can transmit and receive information. As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" can include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Figure 2:
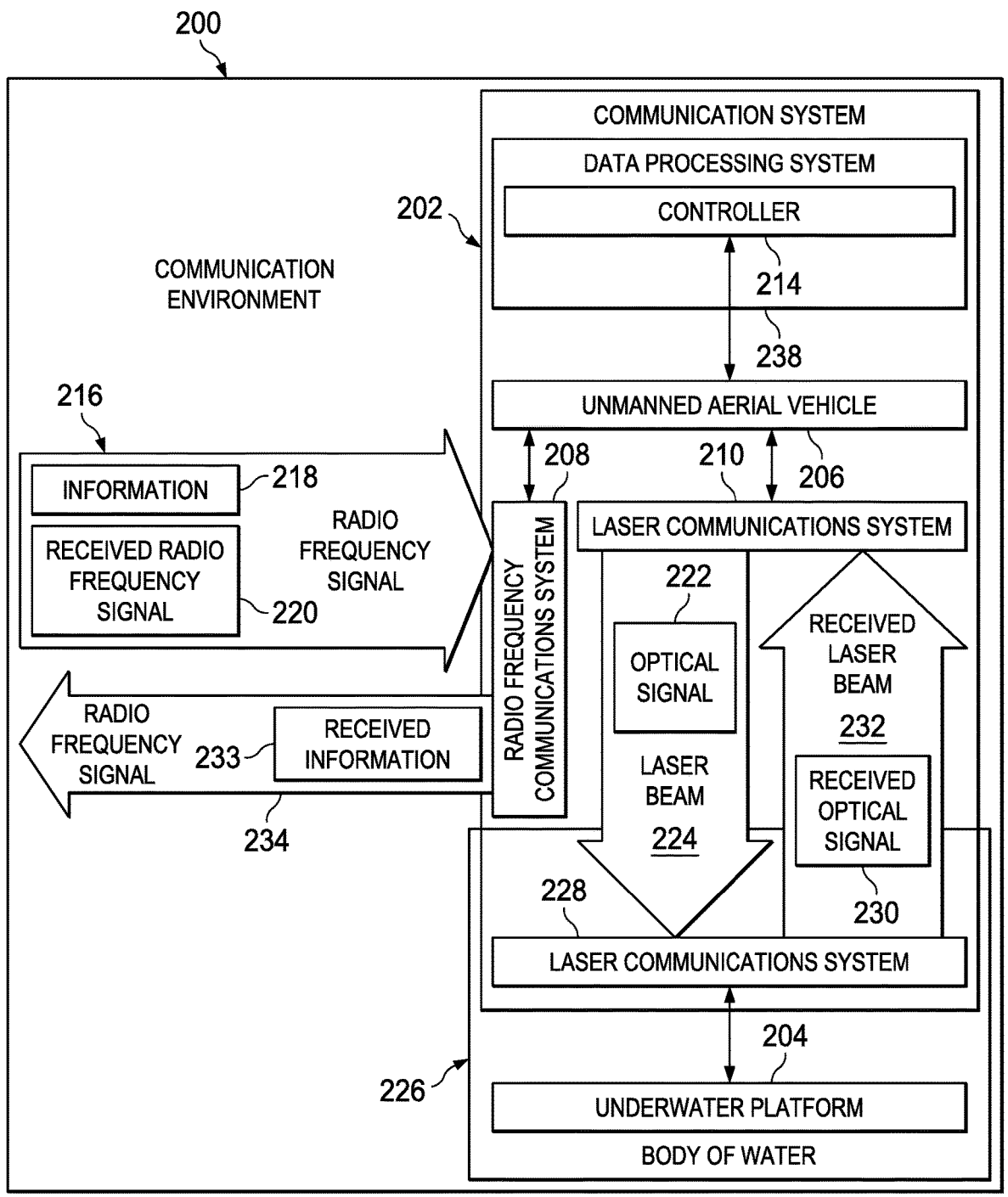
FIG. 2 is an illustration of a block diagram of a communications environment in accordance with an illustrative embodiment.

With reference now to FIG. 2, an illustration of a block diagram of a communications environment is depicted in accordance with an illustrative embodiment. The pictorial illustration of communications environment 100 in FIG. 1 illustrates components that can be implemented in communications environment 200 to enable communications with submerged platforms.

As depicted, communications environment 200 includes communications system 202 for underwater platform 204. Underwater platform 204 can take a number of different forms. For example, underwater platform 204 can be selected from a group comprising a mobile underwater platform, a stationary underwater platform, an underwater vehicle, an unmanned underwater vehicle, a remotely operated underwater vehicle, an autonomous underwater vehicle, a submarine, a submersible, an underwater habitat, an underwater laboratory, and other suitable platforms that can be submerged.

In this illustrative example, communications system 202 comprises unmanned aerial vehicle 206, radio frequency communications system 208, laser communications system 210, and controller 214.

In this illustrative example, radio frequency communications system 208, laser communications system 210, and controller 214 are connected to unmanned aerial vehicle 206. When one component is "connected" to another component, the connection is a physical association. For example, a first component, such as radio frequency communications system 208, can be considered to be physically connected to a second component, such as unmanned aerial vehicle 206, by at least one of being secured to the second component, bonded to the second component, mounted to the second component, welded to the second component, fastened to the second component, or connected to the second component in some other suitable manner. The first component also can be connected to the second component using a third component. The first component may also be considered to be physically connected to the second component by being formed as part of the second component, an extension of the second component, or both.

As depicted, radio frequency communications system 208 and laser communications system 214 are in communication with controller 214. When high frequency radio frequency signals are used, radio frequency communications system 208 is a high frequency radio frequency communications system.

Laser communications system 210 and radio frequency communications system 208 are also in communication with each other. Laser communications system 210 and radio frequency communications 208 can exchange radio frequency signals with each other. In this illustrative example, the communications can be facilitated using a communications media such as a bus, a network, or other type of medium.

In this illustrative example, radio frequency communications system 208 receives radio frequency signal 216. Information 218 is present in radio frequency signal 216. As depicted, information 218 can be placed in radio frequency signal 216 in a number of different ways. For example, information 218 can be encoded into radio frequency signal 216. Information 218 can be encoded using an analog or digital form. Information 218 can be encoded using analog techniques such as frequency modulation, amplitude modulation, phase modulation, and other suitable techniques. Information 218 can be encoded using digital techniques such as phase-shift keying, frequency-shift keying, amplitude-shift keying, quadrature amplitude modulation, and other suitable techniques.

When received by radio frequency communications system 208, radio frequency signal 216 is referred to as received radio frequency signal 220. Received radio frequency signal 220 can take a number of different forms. For example, received radio frequency signal 220 can be selected from a group comprising a high frequency radio frequency signal, a very high frequency radio frequency signal, a medium frequency radio frequency signal, and other suitable frequencies. A high frequency radio frequency signal is a radio frequency signal having a frequency between 3 megahertz and 30 megahertz. A very high frequency radio frequency signal has a frequency from 30 megahertz to 300 megahertz. A medium frequency radio frequency signal is a radio frequency signal having a frequency from 300 kilohertz to 3 megahertz.

As depicted, controller 214 controls laser communications system 210 to place information 218 received in radio frequency signal 216 received by radio frequency communications system 208 into optical signal 222 and control laser communications system 210 to transmit optical signal 222 containing information 218 in a form of laser beam 224 into body of water 226. In this example, information 218 is encoded in laser beam 224. In other words, laser communications system 210 generates and transmits laser beam 224 that contains information 218. Laser beam 224 can be directed by laser communications system 210 to underwater platform 204. Laser communications system 210 can also include a steering mechanism to steer laser beam 224.

Information 218 that is placed in optical signal 222 can be in analog or digital form. Phase-shift keying, quadrature phase-shift keying, or other techniques can be used. As another example, optical pulses in laser beam 224 can encode bits for information 218. In yet another example, an intensity modulation can be used to encode information 218 in laser beam 224.

As depicted, underwater platform 204 includes laser communications system 228, which is part of communications system 202 and receives laser beam 224. Laser communications system 228 can covert laser beam 224 to extract information 218. For example, laser communications system 228 can convert laser beam 224 into a digital signal that is usable by a computer system to process information 218. In other words, laser communications system 228 can extract information 218 from laser beam 224.

The transmission of information 218 with respect to underwater platform 204 can be bidirectional. For example, laser communications system 210 can receive received optical signal 230 containing information 218 in a form of received laser beam 232 from underwater platform 204. Information 218 can be placed into laser beam 232 by encoding, which involves placing information 218 into a particular form.

In the illustrative example, laser communications system 210 and laser communications system 228 can be implemented using any hardware system that is capable of sending and receiving a laser. For example, laser communications system 210 and laser communications system 228 can be implemented using at least one of an optical module, a laser transmitter, a laser detector, a laser transceiver, or some other suitable hardware. In one illustrative example, laser communications system 210 and laser communications system 228 can be implemented using Neptune, which is available from SA Photonics, Inc.

A laser transmitter is a hardware device that converts digital signals into an optical signal in the form of laser. A laser detector is a hardware device that converts a laser beam back into a digital electrical signal. An optical module can send and receive laser beams that are encoded with information in which the encoding is performed by modulating the laser beam.

Controller 214 also can control laser communications system 210 to obtain received information 233 from received optical signal 230 received by laser communications system 210 in the form of received laser beam 232 and place received information 233 into radio frequency signal 234 and control radio frequency communications system 208 to transmit radio frequency signal 234.

As depicted, controller 214 controls unmanned aerial vehicle 206 to fly over body of water 226 in a location where laser communications system 210 directs laser beam 224 at underwater platform 204 that is submerged in body of water 226. Unmanned aerial vehicle 206 can take a number of different forms. For example, unmanned aerial vehicle 206 can be selected from one of a drone, a fixed wing done, a rotary wing unmanned aerial drone, a rotorcraft, a fixed wing hybrid vertical takeoff and landing (VTOL) aircraft, or some other suitable type of unmanned aerial vehicle.

Controller 214 can be implemented in software, hardware, firmware, or a combination thereof. For example, controller 214 can be implemented as part of data processing system 238 for unmanned aerial vehicle 206. Data processing system 238 is a hardware system that includes a processor unit that is configured to perform operations. Data processing system 238 can also include components such as a memory, a storage device, or other suitable components. When software is used, the operations performed by controller 214 can be implemented in program code configured to run on hardware, such as a processor unit. When firmware is used, the operations performed by controller 214 can be implemented in program code and data and stored in a persistent memory to run on a processor unit. When hardware is employed, the hardware may include circuits that operate to perform the operations in controller 214.

In the illustrative examples, the hardware may take a form selected from at least one of a circuit system, an integrated circuit, an application-specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components, excluding a human being. For example, the processes can be implemented as circuits in organic semiconductors.

For example, controller 214 can be implemented as part of data processing system 238 for unmanned aerial vehicle 206. Data processing system 238 is a hardware system that includes a processor unit that is configured to perform operations. Data processing system 238 can also include components such as a memory, a storage device, or other suitable components. The processor unit can include one or more processors. For example, the processor unit for controller 214 can include at least one of a central processing unit, a digital signal processor, a graphics processing unit, a co-processor, or other suitable types of processors.

Figure 3:
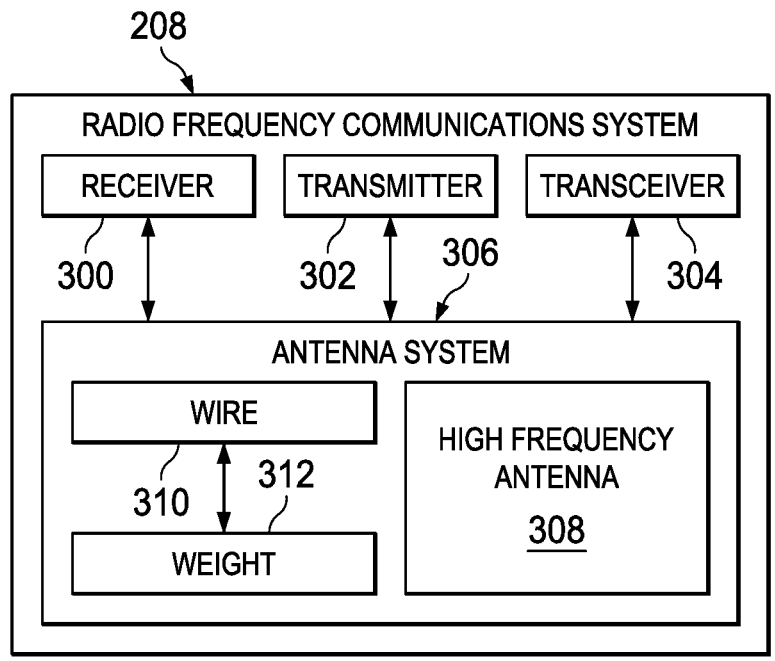
FIG. 3 is an illustration of a block diagram of an implementation of a radio frequency communications system in accordance with an illustrative embodiment.

With reference next to FIG. 3, an illustration of a block diagram of an implementation of a radio frequency communications system is depicted in accordance with an illustrative embodiment. In the illustrative examples, the same reference numeral may be used in more than one figure. This reuse of a reference numeral in different figures represents the same element in the different figures.

An example of components that can be used to implement radio frequency communications system 208 is shown in this figure. As depicted, radio frequency communications system 208 can include at least one of receiver 300 or transmitter 302. Alternatively, radio frequency communications system 208 may include transceiver 304 in place of receiver 300 and transmitter 302. Receiver 300 and transceiver 304 can output information in response to receiving a radio frequency signal encoded with information. This information can be sent be sent to laser communications system 210 for encoding into an optical signal such as a laser beam.

Radio frequency communications system 208 also includes antenna system 306. Antenna system 306 comprises a group of antennas. As used herein, "a group of," when used with reference to items, means one or more items. For example, "a group of antennas" is one or more antennas.

When more than one antenna is present in antenna system 306, the antennas can be the same type or can be different types. In one illustrative example, antenna system 306 comprises high frequency antenna 308. When high frequency antenna 308 is present, high frequency antenna 308 can comprise wire 310 having a fixed end connected to unmanned aerial vehicle 206, a free end, and a length sufficient to receive high frequency radio frequency signals. Further, weight 312 can be at the free end of wire 310.

As depicted, weight 312 is sufficient to cause wire 310 to hang. Weight 312 can have a value that is sufficient for wire 310 to remain hanging downward when exposed to wind in an environment.

In this example, wire 310 hangs such that wire 310 is substantially perpendicular to a surface, such as the surface of body of water 226. As depicted, wire 310 is a flexible, electrically conductive strand. Wire 310 is designed to generate a current in response to receiving a radio frequency signal. The length of wire 310 is selected based on the frequency or wavelength of the radio frequency signal.

Wire 310 can have at least one of a cover or insulation. In some illustrative examples, wire 310 is flexible enough be coiled around a drum, a spool, or a cylinder. For example, the cylinder can be about 2 inches high and have a diameter of 2.5 inches. The size can be selected to allow for deployment, retraction, and storage of wire 310 by unmanned aerial vehicle 206.

Figure 4:
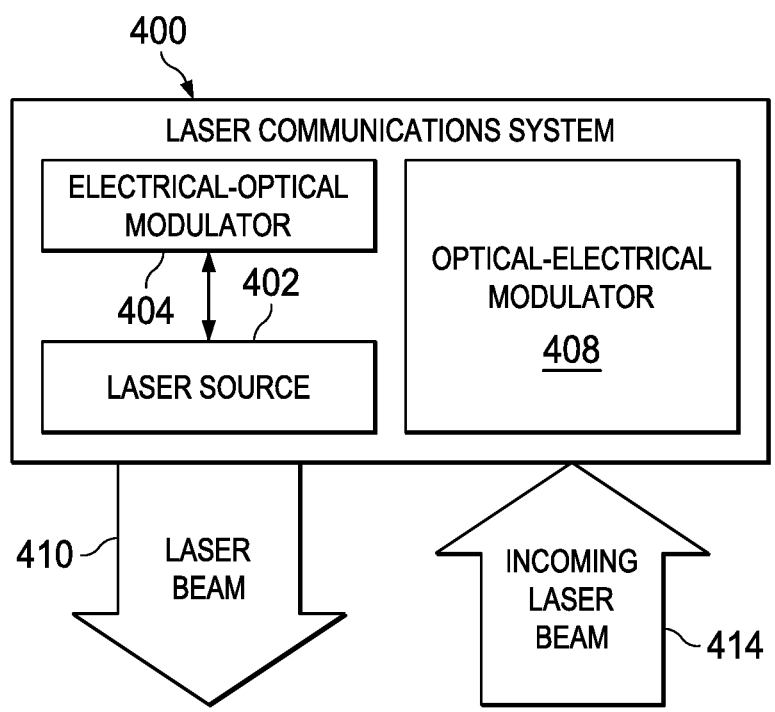
FIG. 4 is an illustration of a block diagram of an implementation of a laser communications system in accordance with an illustrative embodiment.

Turning to FIG. 4, an illustration of a block diagram of an implementation of a laser communications system is depicted in accordance with an illustrative embodiment. Laser communications system 400 is an example of one manner in which laser communications system 210 and laser communications system 228 in FIG. 2 can be implemented. As depicted, laser communications system 400 comprises laser source 402, electrical-optical modulator 404, and optical-electrical modulator 408

In this illustrative example, laser source 402 generates laser beam 410.

Laser source 402 can take a number of forms. For example, laser source 402 can include at least one of a gas laser, a chemical laser, a solid-state laser, a semiconductor laser, or some other suitable type of laser. The wavelength of laser beam 410 can be selected to increase the distance that laser beam 410 can travel in water and, in particular, in seawater. For example, laser beam 410 can have a wavelength of 520 nm to travel with reduced attenuation in seawater.

As depicted, electrical-optical modulator 404 is a hardware system or device that controls laser source 402 to encode information in a laser beam emitted by laser source 402. In other examples, electrical-optical modulator 404 can receive the laser beam from laser source 402 and modulate the laser beam to encode the information. In the illustrative example, electrical-optical modulator 404 can modulate at least one of amplitude, frequency, phase, polarization, pulse width, or other characteristics of the laser beam to encode data in the laser beam.

In the illustrative example, the information can be received from radio frequency communications system 208 or a system in underwater platform 204, depending on whether laser communications system 400 is used to implement laser communications system 210 or laser communications system 228. The system in underwater platform 204 can be a radio system, a computer system, or some other system in underwater platform 204. As depicted, electrical-optical modulator 404 encodes information in the laser beam by controlling laser source 402 to modulate the laser beam.

In the illustrative example, optical-electrical modulator 408 is a hardware system or device that detects incoming laser beam 414 and extract information from incoming laser beam 414. Optical-electrical modulator 408 can employ any number of known techniques or systems for exacting information from optical signals such as laser beams.

For example, a photodiode can be used to convert the photons in the laser beam into an electrical current. With incoming laser beam 414, incoming laser beam 414 can be interfered with a reference beam before being converted into an electrical signal using a photodiode. The information in the electrical current can then be encoded into a radio frequency signal for transmission or used for other purposes.

Figure 5:
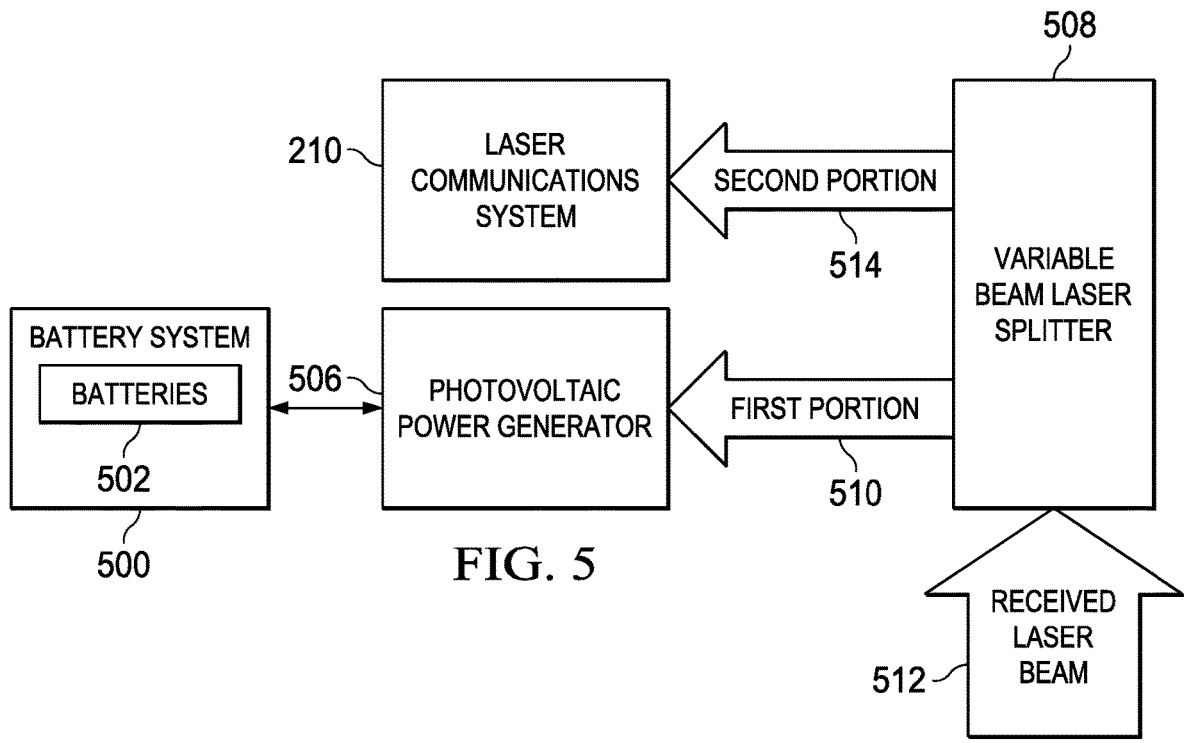
FIG. 5 is an illustration of a block diagram of a charging system for an unmanned aerial vehicle in accordance with an illustrative embodiment.

With reference to FIG. 5, an illustration of a block diagram of a charging system for an unmanned aerial vehicle is depicted in accordance with an illustrative embodiment. As depicted, unmanned aerial vehicle includes battery system 500. Battery system 500 is a hardware system comprised of a group of batteries 502. Battery system 500 provides power to at least one of unmanned aerial vehicle 206, radio frequency communications system 208, laser communications system 210, or controller 214. The group of batteries 502 can be selected from at least one of a lithium-ion battery, a lithium-air battery, a nickel zinc battery, or some other suitable type of battery.

The group of batteries 502 can be recharged by battery charging system 504 when underwater platform 204 transmits received laser beam 232 to unmanned aerial vehicle 206. Battery charging system 504 comprises photovoltaic power generator 506 and variable beam laser splitter 508. Photovoltaic power generator 506 is connected to unmanned aerial vehicle 206. Variable beam laser splitter 508 is located in laser communications system 210 in this illustrative example. Photovoltaic power generator 506 is electrically connected to battery system 500.

In the illustrative example, variable laser beam splitter is controlled to send first portion 510 of received laser beam 512 to photovoltaic power generator 506 and second portion 514 of received laser beam 512 to laser communications system 210. As depicted, photovoltaic power generator 506 charges battery system 500 using first portion 510 of received laser beam 512, and laser communications system 210 extracts information encoded in second portion 514 of received laser beam 512 with the received optical signal into the radio frequency signal.

The amount of energy in first portion 510 and second portion 512 can be selected to provide the maximum amount of energy for recharging battery system 500 while providing a desired amount of energy to identify or decode information from received laser beam 512. If battery system 500 is fully charged, all of received laser beam 512 can be directed to laser communications system 210. Further, if the information is not being transferred, all of received laser beam 512 can be directed to battery charging system 504. In this illustrative example, variable beam laser splitter 508 can be controlled by at least one of controller 214 or laser communications system 210.

With battery charging system 504 and variable beam laser splitter 508, the operation time of unmanned aerial vehicle 206 can be greatly increased. For example, a laser beam can be directed at unmanned aerial vehicle 206 even when information is not transferred to enable charging of battery system 500. Further, with the charging of battery system 500, characteristics such as the intensity of the laser beam can be increased without reducing the operating time of unmanned aerial vehicle 206 in an undesired manner.

In one illustrative example, one or more technical solutions are present that overcome a technical problem with communicating with a submerged underwater vehicle. As a result, one or more technical solutions provide a technical effect of facilitating communications with a submerged underwater platform. One or more technical solutions are present that enable the submerged underwater platform to at least one of receive or transmit information transmitted in radio frequency signals.

One or more technical solutions include an unmanned aerial vehicle that receives information in a radio frequency signal, places the information in an optical signal such as a laser beam, and transmits the optical signal to the submerged underwater platform. One or more technical solutions place the information in an optical signal in the form of laser beam. One or more technical solutions also provide an ability for the unmanned aerial vehicle to receive the information in a laser signal from the submerged underwater platform, place the information into a radio frequency signal, and transmit the radio frequency signal containing the information.

Thus, one or more of the illustrative examples enable submerged underwater platforms to at least one of send or receive information transmitted within a global communications system that employs radio frequency signals such as high frequency radio frequency signals.

As a result, data processing system 238 operates as a special purpose data processing system in which controller 214 in data processing system 238 enables a submerged underwater platform to receive information transmitted through radio frequency signals. In particular, controller 214 transforms processing system 238 into a special purpose data processing system as compared to currently available data processing systems that do not have controller 214.

The illustrations of communications environment 200 and the different components in communications environment 200 in FIGS. 1-5 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, variable beam laser splitter 508 is shown located in laser communications system 210 instead of being shown as a separate component external to laser communications system 210.

Figure 6:
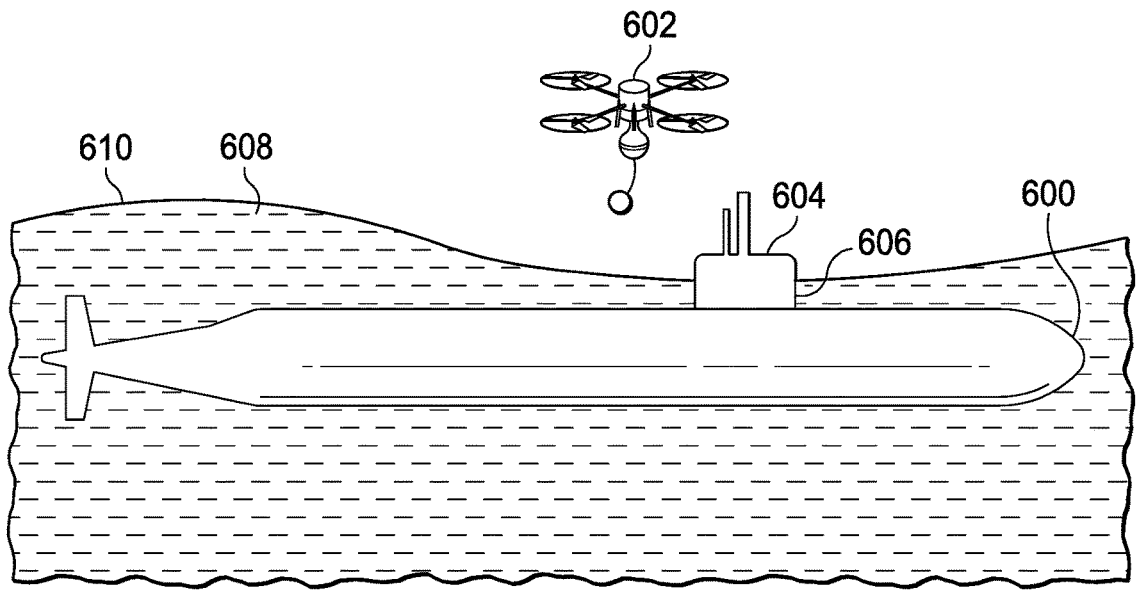
FIG. 6 is a pictorial illustration of a deployment of a communications system for an underwater platform in accordance with an illustrative embodiment.

With reference now to FIG. 6, a pictorial illustration of a deployment of a communications system for an underwater platform is depicted in accordance with an illustrative embodiment. In this illustrative example, submarine 600 launches unmanned aerial vehicle 602 from compartment 604 in conning tower 606 when submarine 600 is surfaced in ocean 608. In other illustrative examples, submarine 600 remains submerged in ocean 608 with unmanned aerial vehicle 602 floating to surface 610 of ocean 608 before taking off.

Figure 7:
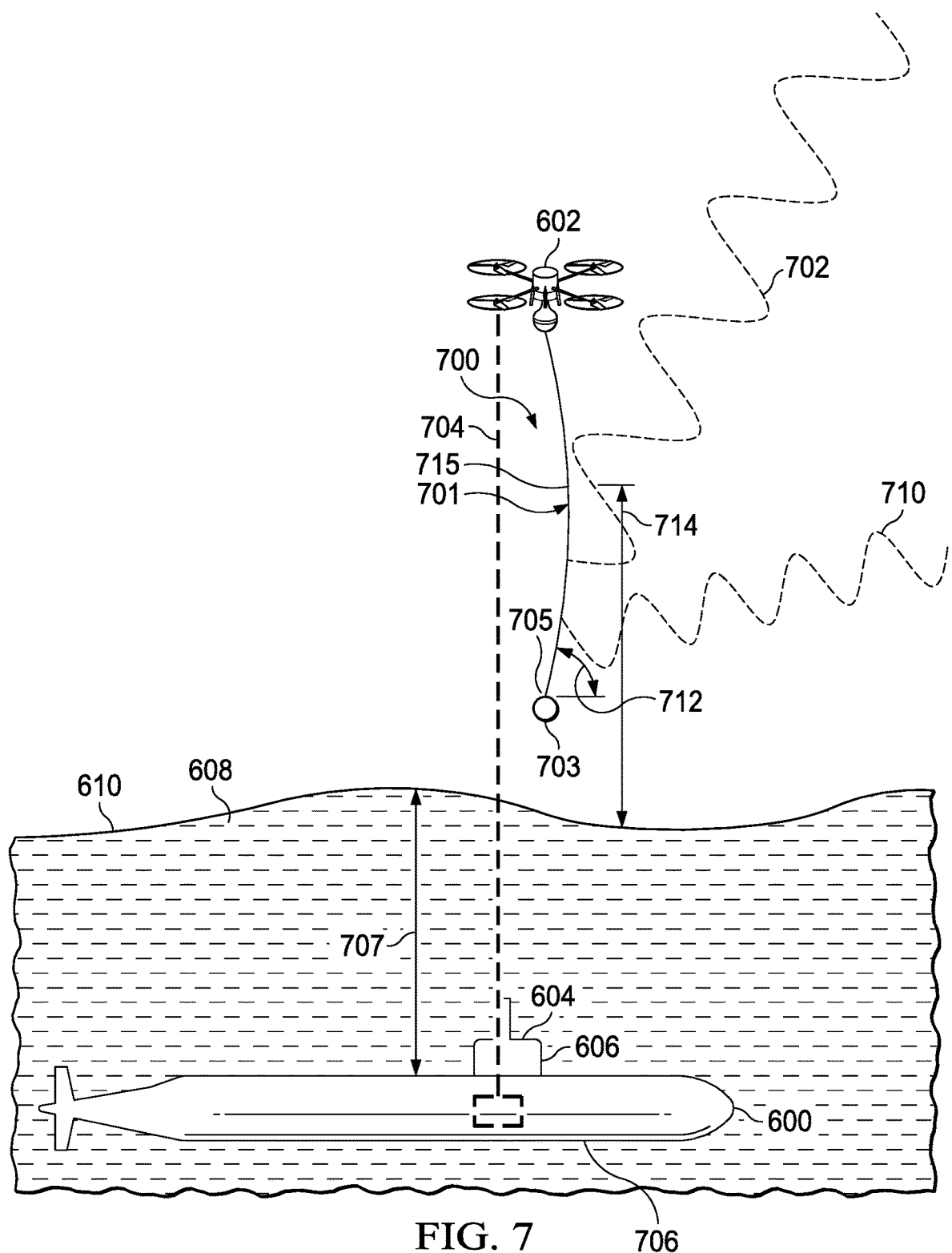
FIG. 7 is a pictorial illustration of facilitating radio frequency communications with a submerged submarine in accordance with an illustrative embodiment.

With reference next to FIG. 7, a pictorial illustration of facilitating radiofrequency communications with a submerged submarine is depicted in accordance with an illustrative embodiment. As depicted, unmanned aerial vehicle 602 has deployed long antenna 700. In this illustrative example, long antenna 700 comprises wire 701 with weight 703 at free end 705 of wire 701. Weight 703 is selected to cause wire 701 to hang from unmanned aerial vehicle 602 such that wire 701 is substantially perpendicular to surface 610 of ocean 608. In this illustrative example, surface 610 of the ocean 608 is the ground or conducting plane for long antenna 700.

The length (L) of long antenna 700 is L=wavelength/2. Long antenna 700 is a vertical half-wave antenna in this example. In this example, wavelength is the wave length of the radio frequency of interest. For example, with high frequency radio frequency signals, the wavelength is from about 10 m to 100 m. As a result, the length of long antenna 700 can be from about 5 m to 50 m.

As depicted, in this example, high frequency radio frequency signal 702 is received at long antenna 700. Information in radio frequency signal 702 is placed into an optical signal in the form of laser beam 704, which is directed at laser communications system 706 for submarine 600. In this example, submarine 600 is submerged at depth 707 below surface 610 of ocean 608. In one illustrative example, depth 707 can be, for example, from 100 m to 500 m. The maximum value for depth 707 at which information can be transmitted to submarine 600 can depend on characteristics of laser beam 704 and the seawater in ocean 608. For example, characteristics such as wavelength and intensity can be controlled to increase or maximize depth 707.

Further, unmanned aerial vehicle 602 can also transmit high frequency radio frequency signal 710 from long antenna 700. High frequency radio frequency signal 710 is transmitted at launch angle 712, which is based on elevation 714 of long antenna 712 above surface 610 of ocean 608. Launch angle 602 is an angle measured from a plane on surface 610 of ocean 608. In this example, elevation 714 is measured from midpoint 715 of long antenna 700.

By changing elevation 714, the radiation pattern from long antenna 700 can vary, resulting in a varying launch angle 712 for high frequency radio frequency signal 710. For example, when long antenna 700 is a vertical half-wave antenna and elevation 714 of long antenna 700 is above the conducting plane, defined by surface 610 of ocean 608, ¼ the wavelength of high frequency radio frequency signal 710, the peak of the main radiation lobe for long antenna 700 lies at an angle of about zero degrees relative to the conducting plane. If elevation 714 is increased to ½ the wavelength of high frequency radio frequency signal 710, a second, smaller radiation lobe for long antenna 700 appears having a gain peak at about 28 degrees. If elevation 714 is further increased to ¾ the wavelength of high frequency radio frequency signal 710, the peak gain of the second, the smaller radiation lobe for long antenna 700 becomes much greater than the min radiation lobe in magnitude and this peak is located at about 19 degrees."

Thus, launch angle 712 can be controlled by varying elevation 714. In this illustrative example, variations in elevation 714 change the vertical plane radiation patterns of long antenna 700. For example, the pattern and shape of lobes can be controlled such that a desired amount of the radio frequency signal travels from long antenna 700 with a desired launch angle. Thus, by controlling elevation 714, the radiation patterns can be controlled in a manner that provides a desired launch angle.

The illustration of unmanned aerial vehicle 602 facilitating communications with submarine 600 in FIG. 6 and FIG. 7 is provided as an example of one implementation for unmanned aerial vehicle 206 and underwater platform 204 shown in block form in FIG. 2. This illustration is not meant to limit the manner in which other illustrative examples can be implemented.

For example, another underwater platform such as a submersible or an underwater habitat can be used in place of submarine 600. In yet another illustrative example, one or more unmanned aerial vehicles for the same type or different types may be used in addition to or in place of unmanned aerial vehicle 602 to facilitate communications with the submarine 600.

In yet another example, the unmanned aerial vehicle 602 can fly in circles to launch circularly polarized radio frequency signals. Further, weight 703 can be a float on free end 705 of wire 701 to reduce weight supported by unmanned aerial vehicle 602, which aids in extending battery life.

Figure 8:
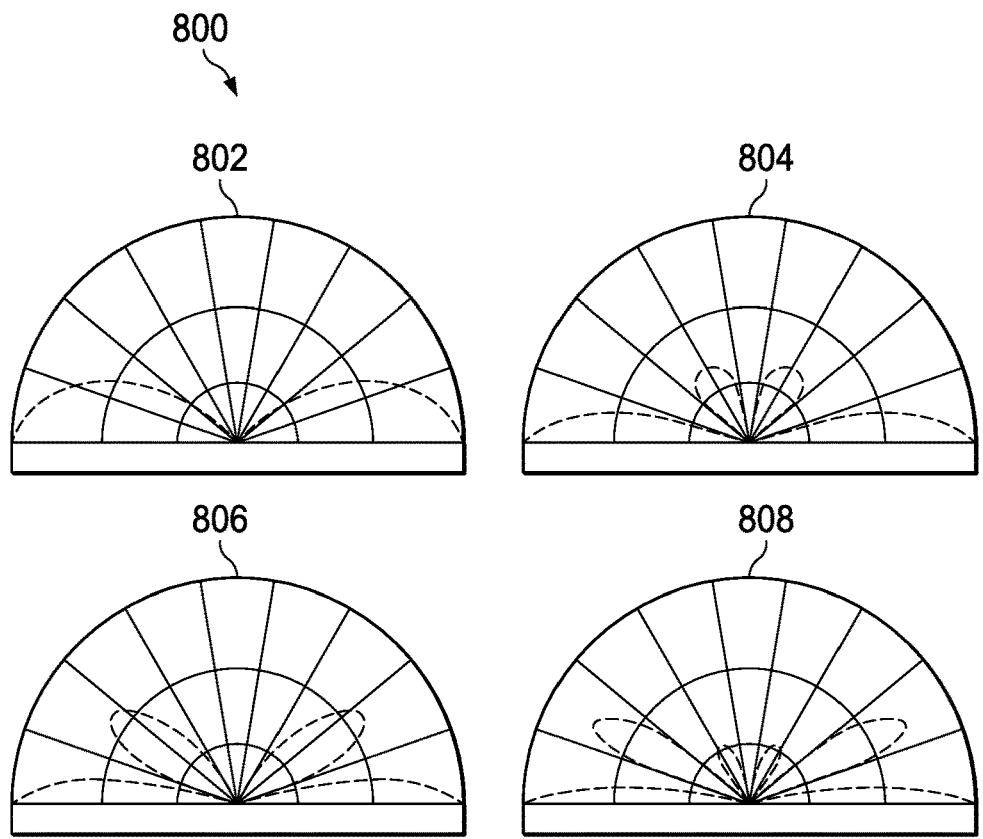
FIG. 8 is an illustration of launch angles for an antenna at different elevations in accordance with an illustrative embodiment.

Turning next to FIG. 8, an illustration of launch angles for an antenna at different elevations is depicted in accordance with an illustrative embodiment. In this illustrative example, radiation patterns 800 are shown for long antenna 700 in FIG. 7 at different elevations of long antenna 700.

Radiation pattern 802, radiation pattern 804, radiation pattern 806, and radiation pattern 808 are depicted. Radiation pattern 802 is present for elevation 714 in FIG. 7 that is E=λ/4, wherein E is elevation 714 and λ is the wavelength of high frequency radio frequency signal 710 transmitted from long antenna 700.

Radiation pattern 804 is present for elevation 714 that is E=λ/2. Radiation pattern 804 is present for elevation 714 that is E=3λ/4, and radiation pattern 804 is present for elevation 714 that is E=λ.

In these examples, a radiation pattern can be selected for launching high frequency radio frequency signal 710 at an angle that is suitable for global communications. Radiation pattern 802 and radiation pattern 804 can be used for launch high frequency radio frequency signal 710 at destinations that are in the line of sight of unmanned aerial vehicle 602.

Figure 9:
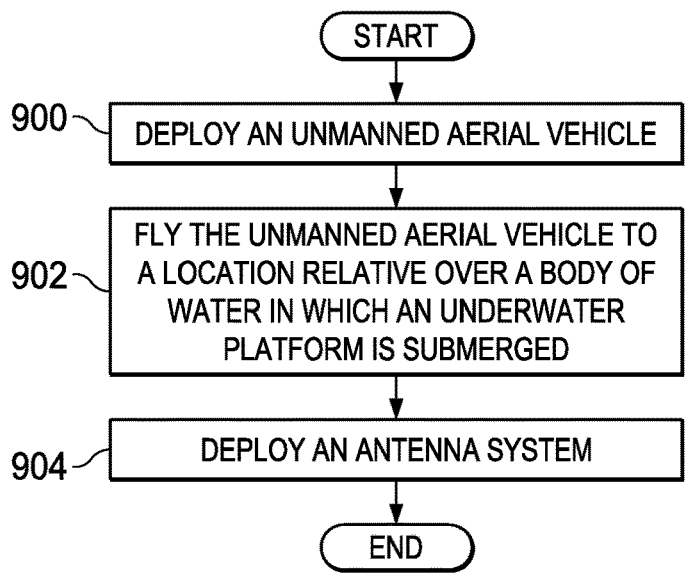
FIG. 9 is an illustration of a flowchart of a process for deploying an unmanned aerial vehicle to facilitate communications with an underwater platform in accordance with an illustrative embodiment.

Turning next to FIG. 9, an illustration of a flowchart of a process for deploying an unmanned aerial vehicle to facilitate communications with an underwater platform is depicted in accordance with an illustrative embodiment. The process illustrated in FIG. 9 can be implemented in communications environment 200 using unmanned aerial vehicle 206 in FIG. 2.

The process begins by deploying an unmanned aerial vehicle (operation 900). In operation 900, the unmanned aerial vehicle can be deployed by an underwater platform, a surface ship, an aircraft, or from some other platform. The process flies an unmanned aerial vehicle to a location relative over a body of water in which an underwater platform is submerged (operation 902). The location is selected as one from which a laser beam can be directed from the unmanned aerial vehicle to the underwater platform.

The process deploys an antenna system (operation 904). For example, if the antenna is a high frequency radio frequency antenna, the antenna can be a long wire that is deployed from a spool or other structure on the unmanned aerial vehicle. The process terminates thereafter.

Figure 10:
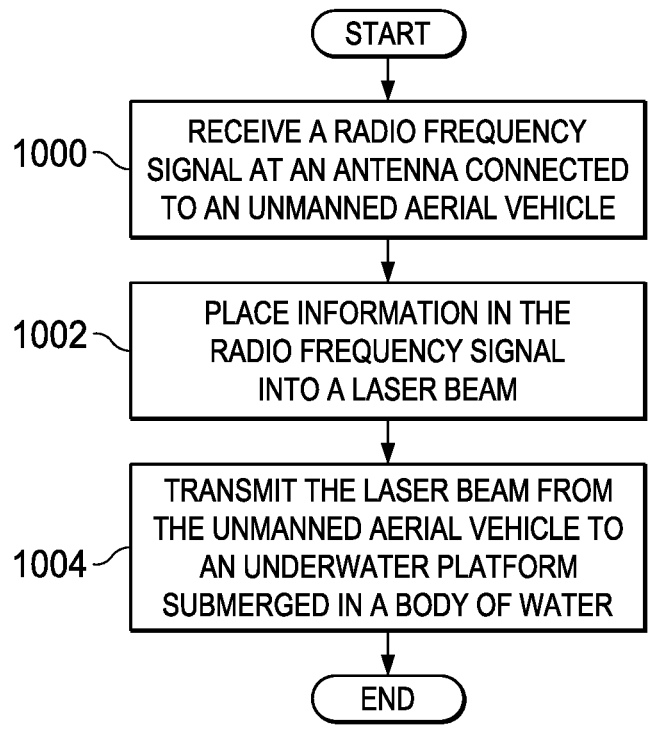
FIG. 10 is an illustration of a flowchart of a process for facilitating communications with an underwater platform in accordance with an illustrative embodiment.

Turning next to FIG. 10, an illustration of a flowchart of a process for facilitating communications with an underwater platform is depicted in accordance with an illustrative embodiment. The process illustrated in FIG. 10 can be implemented in communications environment 200 to send information in a radio frequency signal to an underwater platform using unmanned aerial vehicle 206 in FIG. 2.

The process begins by receiving a radio frequency signal at an antenna connected to an unmanned aerial vehicle (operation 1000). Information is encoded in the radio frequency signal. The process places information in the radio frequency signal into a laser beam (operation 1002). The process transmits the laser beam from the unmanned aerial vehicle to an underwater platform submerged in a body of water (operation 1004). The process terminates thereafter.

Figure 11:
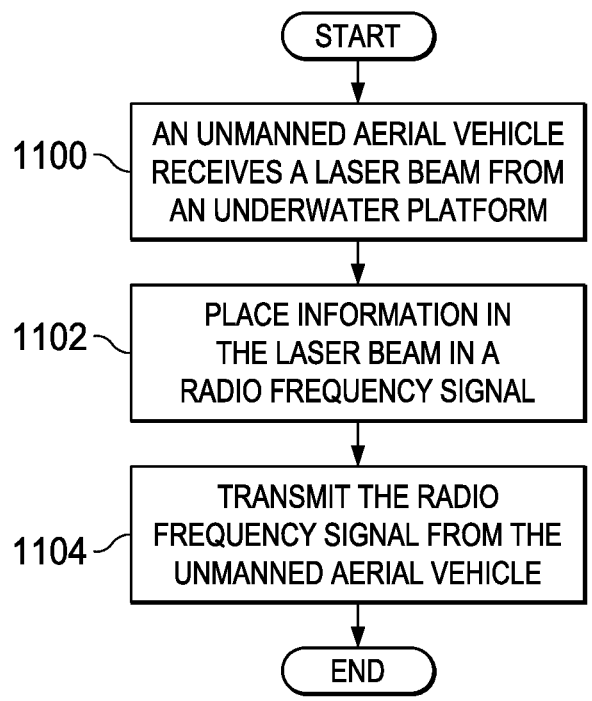
FIG. 11 is an illustration of a flowchart of a process for facilitating communications with an underwater platform in accordance with an illustrative embodiment.

Turning next to FIG. 11, an illustration of a flowchart of a process for facilitating communications with an underwater platform is depicted in accordance with an illustrative embodiment. The process illustrated in FIG. 11 can be implemented in communications environment 200 to transmit information received from an underwater platform in a radio frequency signal using unmanned aerial vehicle 206 in FIG. 2.

The process begins with an unmanned aerial vehicle receiving a laser beam from an underwater platform (operation 1100). Information is encoded in the laser beam. The process places information in the laser beam in a radio frequency signal (operation 1102). The process transmits the radio frequency signal from the unmanned aerial vehicle (operation 1104). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 12:
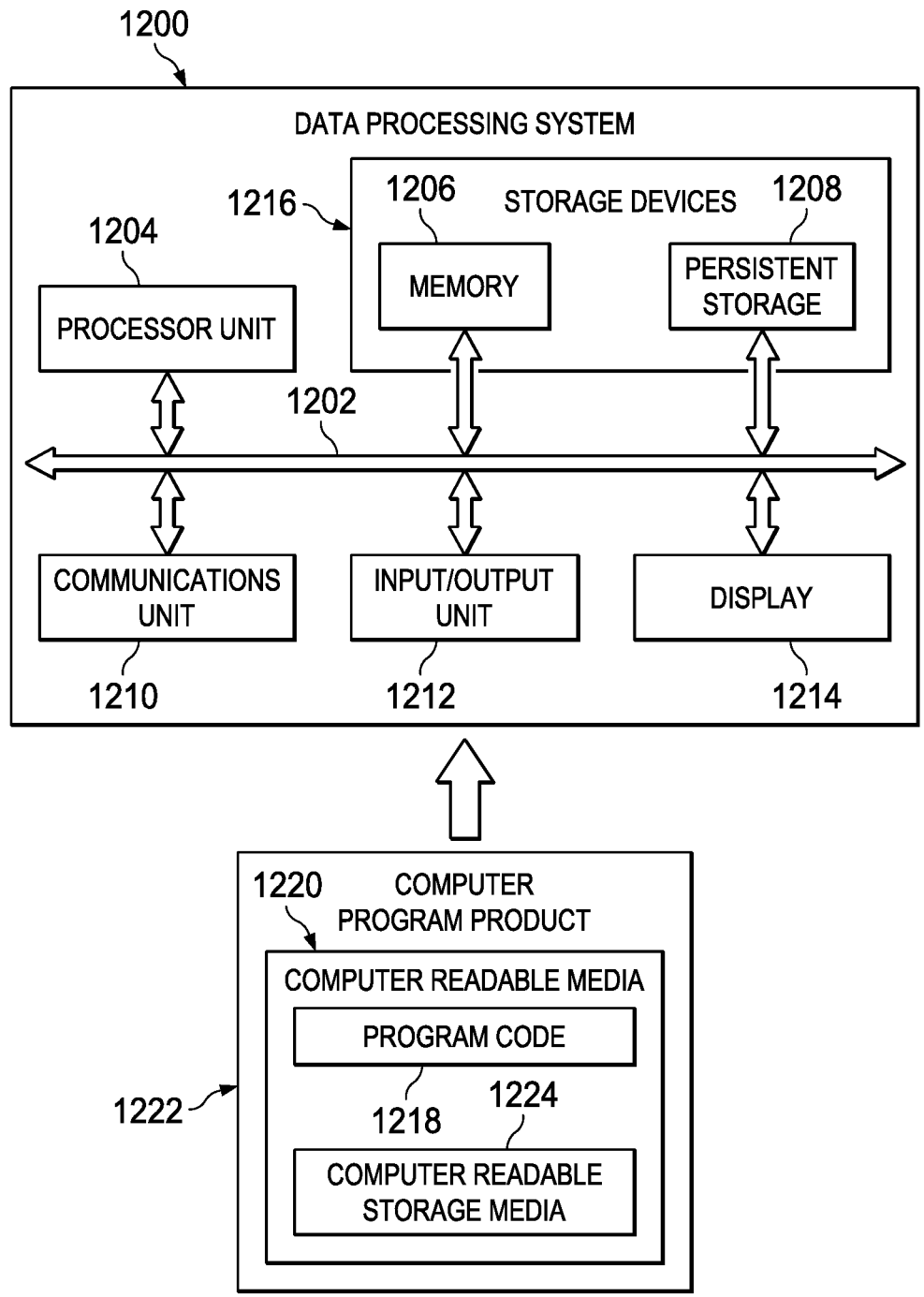
FIG. 12 is an illustration of a block diagram of a data processing system in accordance with an illustrative embodiment.

Turning now to FIG. 12, an illustration of a block diagram of a data processing system is depicted in accordance with an illustrative embodiment. Data processing system 1200 can be used to implement data processing system 238, radio frequency communications system 208, laser communications system 210, and laser communications system 228 in FIG. 2, and laser communications system 400 in FIG. 4. In this illustrative example, data processing system 1200 includes communications framework 1202, which provides communications between processor unit 1204, memory 1206, persistent storage 1208, communications unit 1210, input/output (I/O) unit 1212, and display 1214. In this example, communications framework 1202 may take the form of a bus system.

Processor unit 1204 serves to execute instructions for software that can be loaded into memory 1206. Processor unit 1204 can be a number of processors, a multi-processor core, or some other type of processor, depending on the particular implementation.

Memory 1206 and persistent storage 1208 are examples of storage devices 1216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1216 may also be referred to as computer-readable storage devices in these illustrative examples. Memory 1206, in these examples, can be, for example, a random-access memory or any other suitable volatile or non-volatile storage device. Persistent storage 1208 may take various forms, depending on the particular implementation.

For example, persistent storage 1208 may contain one or more components or devices. For example, persistent storage 1208 can be a hard drive, a solid-state drive (SSD), a flash memory, a rewritable optical disk, a rewritable magnetic tape, or some combination of the above. The media used by persistent storage 1208 also can be removable. For example, a removable hard drive can be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that can be connected to data processing system 1200. For example, input/output unit 1212 may provide a connection for user input through at least one of a keyboard, a mouse, or some other suitable input device. Further, input/output unit 1212 may send output to a printer. Display 1214 provides a mechanism to display information to a user.

Instructions for at least one of the operating system, applications, or programs can be located in storage devices 1216, which are in communication with processor unit 1204 through communications framework 1202. The processes of the different embodiments can be performed by processor unit 1204 using computer-implemented instructions, which may be located in a memory, such as memory 1206.

These instructions are referred to as program code, computer usable program code, or computer-readable program code that can be read and executed by a processor in processor unit 1204. The program code in the different embodiments can be embodied on different physical or computer-readable storage media, such as memory 1206 or persistent storage 1208.

Program code 1218 is located in a functional form on computer-readable media 1220 that is selectively removable and can be loaded onto or transferred to data processing system 1200 for execution by processor unit 1204. Program code 1218 and computer-readable media 1220 form computer program product 1222 in these illustrative examples. In the illustrative example, computer-readable media 1220 is computer-readable storage media 1224.

In these illustrative examples, computer-readable storage media 1224 is a physical or tangible storage device used to store program code 1218 rather than a medium that propagates or transmits program code 1218.

Alternatively, program code 1218 can be transferred to data processing system 1200 using a computer-readable signal media. The computer-readable signal media can be, for example, a propagated data signal containing program code 1218. For example, the computer-readable signal media can be at least one of an electromagnetic signal, an optical signal, or any other suitable type of signal. These signals can be transmitted over at least one of communications links, such as wireless communications links, optical fiber cable, coaxial cable, a wire, or any other suitable type of communications link.

The different components illustrated for data processing system 1200 are not meant to provide architectural limitations to the manner in which different embodiments can be implemented. The different illustrative embodiments can be implemented in a data processing system including components in addition to or in place of those illustrated for data processing system 1200. Other components shown in FIG. 12 can be varied from the illustrative examples shown. The different embodiments can be implemented using any hardware device or system capable of running program code 1218.

Thus, the illustrative examples provide a method, apparatus, and system for facilitating communications with a submerged underwater platform. A radio frequency signal is received at an antenna connected to an unmanned aerial vehicle. Information is encoded in the radio frequency signal. The information in the radio frequency signal is placed into a laser beam. The laser beam is transmitted from the unmanned aerial vehicle to an underwater platform submerged in a body of water.

One or more technical solutions are present that overcome a technical problem with communicating with a submerged underwater vehicle using radio frequency signals. As a result, one or more technical solutions provide a technical effect of facilitating communications with a submerged underwater platform. One or more technical solutions enable the submerged underwater platform to at least one of receive or transmit information transmitted in radio frequency signals.

Thus, one or more of the illustrative examples enable submerged underwater platforms to at least one of send or receive information transmitted within a global communications system that employs radio frequency signals such as high frequency radio frequency signals.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A communications system for an underwater platform, wherein the communications system comprises:
    an unmanned aerial vehicle;
    a radio frequency communications system connected to the unmanned aerial vehicle;
    a laser communications system connected to the unmanned aerial vehicle; and
    a controller controls the laser communications system to place information in a received radio frequency signal received by the radio frequency communications system into a laser beam and control the laser communications system to transmit the laser beam that contains the information into a body of water;
    wherein the controller controls the laser communications system to obtain received information in a received laser beam, control the radio frequency communications system to place the received information obtained from the received laser beam into a radio frequency signal and transmit the radio frequency signal containing the received information.

2. The communications system of claim 1, wherein the controller controls the unmanned aerial vehicle to fly over the body of water in a location where the laser communications system directs the laser beam at an underwater platform that is submerged in the body of water.

3. The communications system of claim 1, wherein the radio frequency communications system comprises:
    a transceiver; and
    a high frequency antenna.

4. The communications system of claim 3, wherein the high frequency antenna comprises:
    a wire having a fixed end connected to the unmanned aerial vehicle, a free end, and a length sufficient to receive high frequency radio frequency signals; and
    a weight at the free end of the wire, wherein the weight is sufficient to cause the wire to hang.

5. The communications system of claim 4, wherein the controller controls an elevation of the high frequency antenna relative to a surface the body of water to control a launch angle for the high frequency radio frequency signals transmitted from the wire.

6. The communications system of claim 1, wherein the laser communications system comprises:
    a laser source;
    an electrical-optical modulator connected to the radio frequency communications system and the laser source;
    a laser detector; and
    an optical-electrical modulator connected to the radio frequency communications system and the laser detector.

7. The communications system of claim 1, wherein the received radio frequency signal is selected from a group comprising a high frequency radio frequency signal, a very high frequency radio frequency signal, and a medium frequency radio frequency signal.

8. The communications system of claim 1, wherein the underwater platform is selected from a group comprising a mobile underwater platform, stationary underwater platform, an underwater vehicle, an unmanned underwater vehicle, a remotely operated underwater vehicle, an autonomous underwater vehicle, a submarine, a submersible, an underwater habitat, and an underwater laboratory.

9. The communications system of claim 1, wherein the unmanned aerial vehicle includes a battery system and further comprising:
    a photovoltaic power generator connected to the unmanned aerial vehicle, wherein the photovoltaic power generator is electrically connected to the battery system; and a variable laser beam splitter, wherein the variable laser beam splitter sends a first portion of a received laser beam to the photovoltaic power generator and a second portion of the received laser beam to the laser communications system, wherein that the photovoltaic power generator charges the battery system using the first portion of the received laser beam.

10. A communications system for an underwater platform, wherein the communications system comprises:
    an unmanned aerial vehicle;
    a wire connected to unmanned aerial vehicle, wherein the wire has a length selected to send and receive high frequency radio frequency signals;
    a receiver connected to the unmanned aerial vehicle, wherein the receiver receives the high frequency radio frequency signals received by the wire;
    a laser communications system connected to the unmanned aerial vehicle; and
    a controller that controls the laser communications system to transmit information in a received high frequency radio frequency signal received by the receiver in a laser beam at an underwater platform submerged in a body of water.

11. The communications system of claim 10 further comprising:
    a transmitter that transmits high frequency radio frequency signals from the wire; and
    wherein the laser communications system receives a received laser beam that contains the information and wherein the controller controls the transmitter to transmit the information in a high frequency radio frequency signal from the wire.

12. The communications system of claim 11, wherein the, wherein the controller controls an elevation of the wire relative to a surface the body of water to control a launch angle for the high frequency radio frequency signal transmitted from the wire.

13. A method for facilitating communications with an underwater platform, the method comprising:
    receiving a radio frequency signal at an antenna system connected to an unmanned aerial vehicle, wherein information is encoded in the radio frequency signal;
    placing the information in the radio frequency signal into a laser beam;
    transmitting the laser beam from the unmanned aerial vehicle to an underwater platform submerged in a body of water;
    receiving a received information in a received laser beam from the underwater platform submerged in the body of water;
    placing the received information in the received laser beam into a second radio frequency signal; and
    transmitting the second radio frequency signal with the received information from the antenna system.

14. The method of claim 13 further comprising:
    deploying the unmanned aerial vehicle; and
    flying the unmanned aerial vehicle to a location relative over the body of water in which the underwater platform is submerged.

15. The method of claim 13, wherein the radio frequency signal is selected from a group comprising a high frequency radio frequency signal, a very high frequency radio frequency signal, and a medium frequency radio frequency signal.

16. The method of claim 13, wherein the underwater platform is selected from a group comprising a mobile underwater platform, stationary underwater platform, an underwater vehicle, an unmanned underwater vehicle, a remotely operated underwater vehicle, an autonomous underwater vehicle, a submarine, a submersible, an underwater habitat, and an underwater laboratory.

17. A communications system for an underwater platform, wherein the communications system comprises:
    an unmanned aerial vehicle;
    a radio frequency communications system connected to the unmanned aerial vehicle, wherein the radio frequency communications system comprises:
        a transceiver; and
        a high frequency antenna having a fixed end connected to the unmanned aerial vehicle, a free end, and a length sufficient to receive high frequency radio frequency signals and a weight at the free end of the wire, wherein the weight is sufficient to cause the wire to hang;
    a laser communications system connected to the unmanned aerial vehicle; and
    a controller controls the laser communications system to place information in a received radio frequency signal received by the radio frequency communications system into a laser beam and control the laser communications system to transmit the laser beam that contains the information into a body of water.

18. A communications system for an underwater platform, wherein the communications system comprises:
    an unmanned aerial vehicle;
    a radio frequency communications system connected to the unmanned aerial vehicle;
    a laser communications system connected to the unmanned aerial vehicle, wherein the laser communications system comprises:
        a laser source;
        an electrical-optical modulator connected to the radio frequency communications system and the laser source;
        a laser detector; and
        an optical-electrical modulator connected to the radio frequency communications system and the laser detector; and
    a controller controls the laser communications system to place information in a received radio frequency signal received by the radio frequency communications system into a laser beam and control the laser communications system to transmit the laser beam that contains the information into a body of water.

* * * * *